(12) United States Patent
Miyake et al.

(10) Patent No.: US 6,714,123 B1
(45) Date of Patent: Mar. 30, 2004

(54) ELECTRONIC DEVICE INCORPORATING VIBRATION GENERATOR

(75) Inventors: Hideki Miyake, Osaka (JP); Masami Makino, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 649 days.

(21) Appl. No.: 09/645,034

(22) Filed: Aug. 24, 2000

(30) Foreign Application Priority Data

Aug. 27, 1999 (JP) .......................................... 11-242161

(51) Int. Cl.[7] ................................................ H04B 3/36
(52) U.S. Cl. ...................... 340/407.1; 340/7.6; 310/81
(58) Field of Search ....................... 340/407.1, 825.19, 340/7.6; 310/81

(56) References Cited

U.S. PATENT DOCUMENTS

| | | | | |
|---|---|---|---|---|
| 4,637,732 A | * | 1/1987 | Jones et al. .................. | 368/109 |
| 4,794,392 A | * | 12/1988 | Selinko ........................ | 340/7.6 |
| 4,864,276 A | * | 9/1989 | Tribbey et al. ........... | 340/407.1 |
| 5,107,155 A | * | 4/1992 | Yamaguchi .................. | 310/81 |
| 5,309,140 A | * | 5/1994 | Everett, Jr. et al. ........ | 340/466 |
| 5,619,181 A | * | 4/1997 | Murray ....................... | 340/407.1 |
| 5,894,263 A | * | 4/1999 | Shimakawa et al. ....... | 340/388.1 |
| 5,898,364 A | * | 4/1999 | Gotou ......................... | 340/407.1 |
| 5,986,367 A | * | 11/1999 | Tsuzaki et al. ............... | 310/71 |
| 6,057,753 A | * | 5/2000 | Myers ......................... | 340/407.1 |
| 6,236,306 B1 | * | 5/2001 | Liebelt ........................ | 340/407.1 |
| 6,317,032 B1 | * | 11/2001 | Oishi ........................... | 340/407.1 |
| 6,323,757 B1 | * | 11/2001 | Nagai .......................... | 340/407.1 |
| 6,424,064 B2 | * | 7/2002 | Ibata et al. .................. | 310/81 |
| 6,585,595 B1 | * | 7/2003 | Soma ............................ | 463/36 |

* cited by examiner

Primary Examiner—Benjamin C. Lee
(74) Attorney, Agent, or Firm—Armstrong, Kratz, Quintos, Hanson & Brooks, LLP

(57) ABSTRACT

An electronic device including a vibration generator having an eccentric weight member attached to the output of a motor. The motor is accommodated into a bracket made from elastic material, and the bracket is held in a casing. The bracket has a prism-shaped body, and has a through hole in which the motor is tightly fitted formed the central portion of the body, and the peripheral wall defining the through hole is formed with a slit cut from one end face of the body to a central portion of the body in a specified depth. Accordingly, the vibration generator is accommodated into the bracket with great ease. Moreover, the motor of the vibration generator is unlikely to change easily its rotating angle posture in the interior of the bracket while the bracket is assembled into a casing.

3 Claims, 5 Drawing Sheets

ELECTRONIC DEVICE INCORPORATING VIBRATION GENERATOR

BACKGROUND OF THE INVENTION

1. Field of the Invention

The present invention relates to electronic devices, such as portable telephones and pagers, which comprise as housed in a casing a vibration generator, and more particularly to a construction to support a motor which constitutes a vibration generator.

2. Description of the Related Art

With reference to FIG. 1, a portable telephone comprises a casing 1 formed by a front case 11 and a rear case 12. A display 13 and manual keys 14 are provided on the front case 11. The casing 1 has a vibration generator 2 for notifying the user of incoming calls disposed in its interior. The vibration generator 2 in general comprises an eccentric weight member 21 attached to the output shaft of a motor 22.

The conventional portable telephone, as shown in FIGS. 8 and 9, had a construction that a motor 22 of a vibration generator 2 is placed into a bracket 6 made from silicone rubber, holding the bracket 6 in a casing 1, to have a vibration generator 2 installed in the casing 1. The bracket 6 comprises a prism-shaped body 61 having a through hole 62 in which the motor 22 of the vibration generator 2 is fitted. A peripheral wall defining the through hole 62 is formed with a slit 63 cut over the whole length of the body 61.

In assembling the portable telephone described, firstly, the motor 22 of the vibration generator 2 is enclosed in the through hole 62 of the bracket 6. In this process, the slit 63 of the bracket 6 is widened, to have the motor 22 pushed into the through hole 62 through the slit 63. The bracket 6, thereafter, is inserted into a bracket chamber (not shown) by a press fit formed within the casing 1. This enables the inner periphery of the bracket 6 to come into pressing contact with the outer periphery of the motor 22, to have the motor 22 secured.

A pair of lead wires 23, 24 are connected on the rear end face of the motor 22 to supply a drive current. When the motor 22 is placed into the through hole 62 of the bracket 6, the rotating angle posture of the motor 22 is adjusted in the bracket 6 in order that the pair of lead wires 23, 24 turns to a predetermined direction. This enables the pair of lead wires 23, 24 to extend toward the position of a socket without the interference with the other members (for example, the wall of the bracket chamber).

With the above construction that the vibration generator 2 is supported with the bracket 6 provided, the bracket 6 serves as a cushion to prevent the noise, etc. generated by the operation of the vibration generator 2.

However, with the supporting construction using the conventional bracket 6, as shown in FIG. 9, when the motor 22 of the vibration generator 2 is held in the through hole 62 of the bracket 6, the bracket 6 has an opening on a slit 63 and is free to be widened, so that the outer periphery of the motor 22 is not so stably held in pressing contact that the motor 22 turns easily in the bracket 6 even with the small external force exerted.

Accordingly, in the process for inserting the bracket 6 into the bracket chamber by a press fit, there is likelihood that the motor 22 changes its posture in rotating angle. This will lead the pair of lead wires 23, 24 extending from the rear end face of the motor 22 to turn its direction. A problem is encountered in that if the bracket 6 is inserted into a bracket chamber by a press fit with the wires left in the direction, the lead wires 23, 24 will interfere with the other members.

With the construction that the bracket 6 is not formed with the slit 63 and the through hole 62 is only provided, the inner periphery of the bracket 6 is held in pressing contact with the outer periphery of the motor 22 with the sufficient force even before the bracket 6 being inserted into the bracket chamber by a press fit to obviate the change of the rotating angle posture of the motor 22. However, it is extremely difficult to insert the motor 22 into the through hole 62 of the bracket 6.

SUMMARY OF THE INVENTION

An object of the present invention is to provide an electronic device wherein a vibration generator is supported with a bracket provided in the interior of a casing, and to provide a supporting construction that the vibration generator is placed into the bracket with ease, and the motor of the vibration generator is unlikely to change its posture in rotating angle easily in the bracket during the process for the bracket being placed into the casing.

The invention provides an electronic device which comprises a vibration generator 2 having an eccentric weight member 21 attached to the output shaft of a motor 22 disposed in the interior of a casing 1. The motor 22 is accommodated into a bracket 4 made from elastic material, and the bracket 4 is held in the casing 1. The bracket 4 comprises a prism-shaped body 41. The body 41 has a central portion formed with a through hole 42 in which the motor 22 is tightly fitted. A peripheral wall defining the through hole 42 is formed with a slit 42 cut completely through the wall from one end face of the body 41 and extending to a central portion of the body 41 for a specified distance.

In the assembling process of the electronic device of the invention, when the motor 22 of the vibration generator 2 is accommodated into the through hole 42 of the bracket 4, since the bracket 4 is formed with the slit 43, the slit 43 is widened to have the one end of the through hole 42 opened widely, whereby the motor 22 can be inserted further inwardly through the opening into the through hole 42 with great ease.

Further, with the motor 22 accommodated into the through hole 42 of the bracket 4, the bracket 4 is closed in the region wherein the slit 43 is not provided, so that the inner periphery of the bracket 4 is tightly held in pressing contact with the outer periphery of the motor 22 in the region, obviating the change of the rotating angle posture of the motor 22.

Stated specifically, a projection 44 to contact with an end face of the motor 22 is formed on one end portion of the bracket 4 with the slit 43 provided. With this specific construction, the end face of the motor 22 contacts with the projection 44, whereby the motor 22 can be axially positioned relative to the bracket 4.

With the electronic device of the invention, the vibration generator is accommodated into the bracket with great ease, and the motor of the vibration generator in the bracket is unlikely to change its posture in rotating angle easily during the process for the bracket being placed into the casing.

BRIEF DESCRIPTION OF THE DARWINGS

DETAILED DESCRIPTION OF EMBODIMENTS

Figure 1:
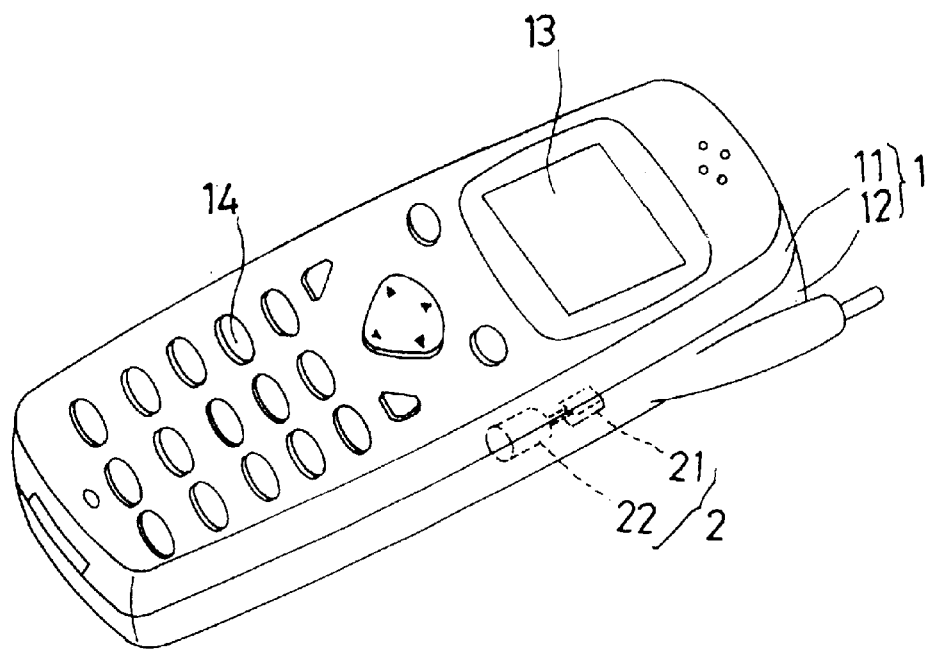
FIG. 1 is a perspective view of the portable telephone to embody the invention.

Portable telephones embodying the present invention will be described below in detail with reference to the drawings. Referring to FIG. 1, the portable telephone of the invention has a flat casing 1 comprising a resin front case 11 and rear case 12. A display 13 and manual keys 14 are provided on the front case 11. The casing 1 has a vibration generator 2 for notifying the user of incoming calls disposed in its interior. The vibration generator 2 comprises an eccentric weight member 21 attached to the output shaft of a motor 22.

Figure 2:
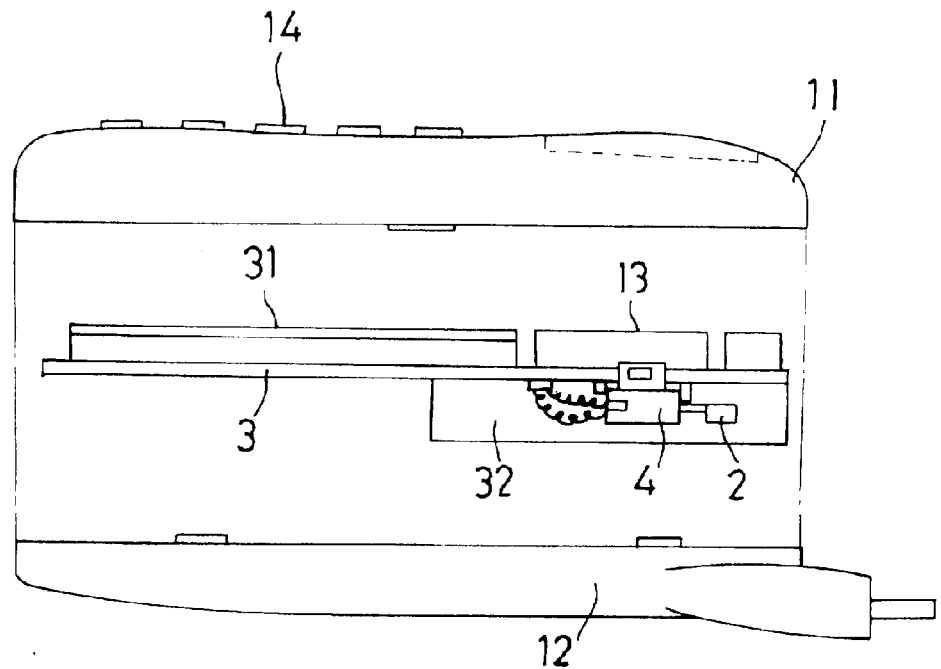
FIG. 2 is an exploded side elevation of the portable telephone embodying the invention.

With reference to FIG. 2, held between the front case 11 and the rear case 12 is a circuit board 3. Arranged on the circuit board 3 are a key sheet 31 to be depressed by the manual key 14, the display 13, a high-frequency circuit module 32 accommodated into a shield case, the vibration generator 2 and so forth. The motor 22 of the vibration generator 2, as shown in FIG. 5, is accommodated into a bracket 4 made from silicone rubber.

Figure 6:
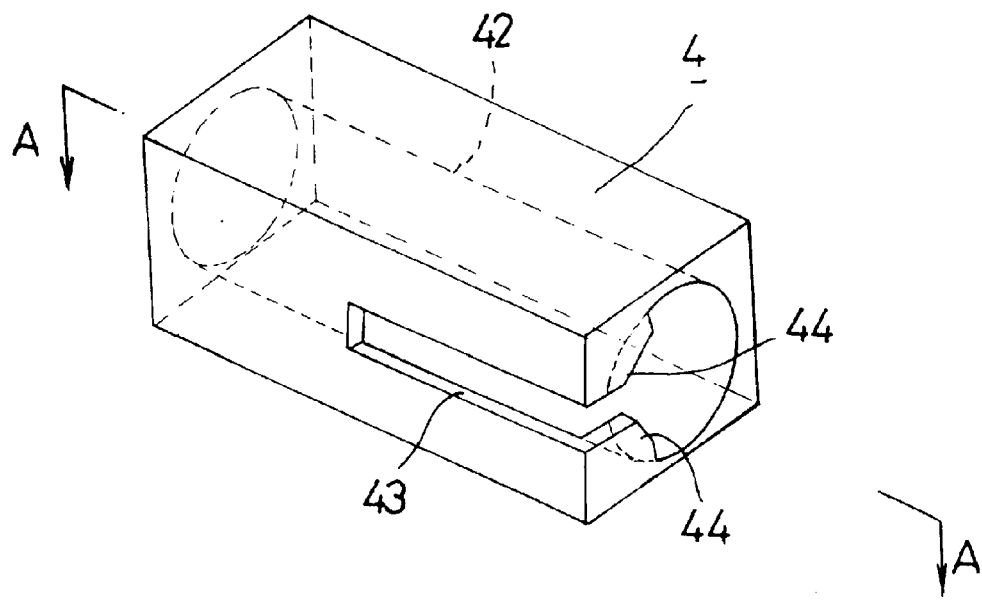
FIG. 6 is an enlarged perspective view of a projection of a bracket.

The bracket 4 comprises a prism-shaped body 41, and a through hole 42 which is slightly smaller than the motor 22 in outside diameter is provided on the central portion of the body 41 with an opening on each end of the body 41. The body 41 of the bracket 4 has the peripheral wall of the through hole 42 formed with a slit 43 cut from one end face to the position of the central portion in a specified depth (for example, positioned at ½ of the whole length of the body 41). With reference to FIG. 6, molded integrally with the body 41 of the bracket 4 are projections 44, 44 protruded inwardly from an inner periphery of the through hole 42 on one end formed with the slit 43.

Figure 5:
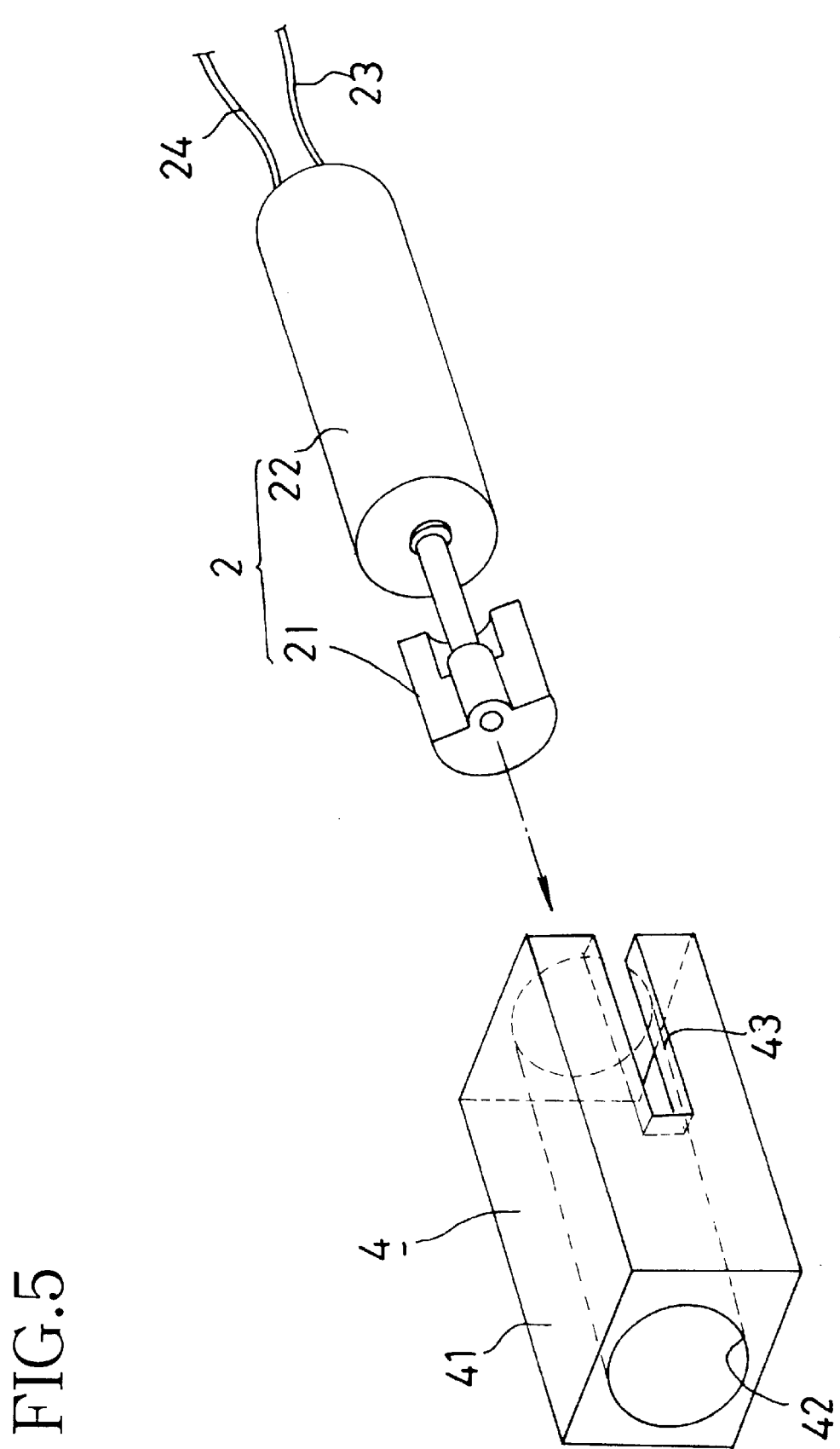
FIG. 5 is an enlarged perspective view of a bracket and a vibration generator.

With reference to FIG. 5, the motor 22 of the vibration generator 2 is accommodated into the bracket 4. In this process, firstly, the eccentric weight member 21 of the vibration generator 2 is inserted into the through hole 42 from through an opening provided with the slit 43 of the bracket 4, and then the motor 22 is inserted into the through hole 42 of the bracket 4. In the process, the slit 43 of the bracket 4 is widened with pressing, having one opening of the through hole 42 extended, whereby the eccentric weight member 21 and the motor 22 can be inserted into the through hole 42 of the bracket 4 with great ease. When the motor 22 is inserted into the through hole 42 of the bracket 4, the rotating angle posture of the motor 22 is adjusted so that a pair of lead wires 23, 24 extending from the rear end of the motor 22 will be in horizontal position.

Figure 7:
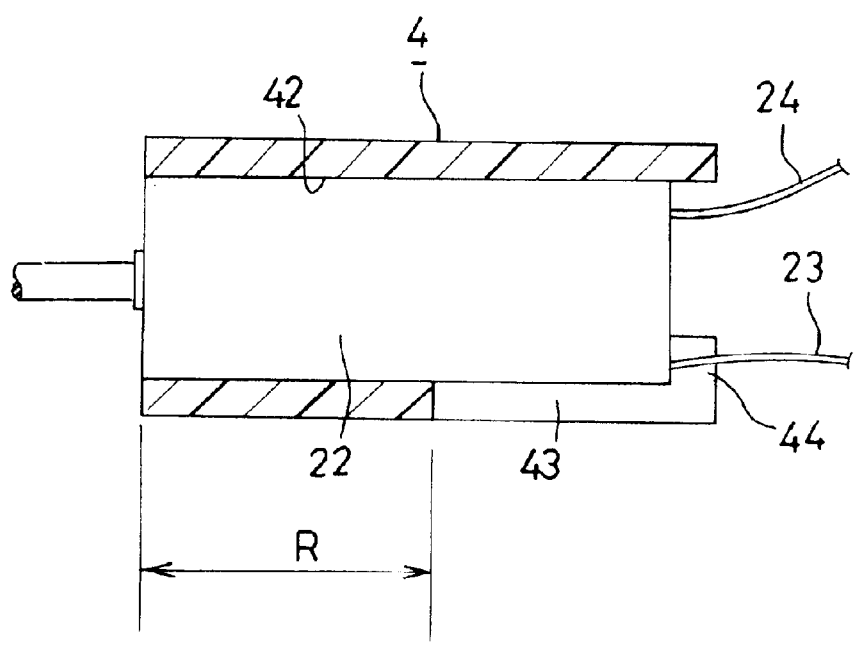
FIG. 7 is a view in section along A—A line in FIG. 6 showing that a motor is accommodated into a bracket.
Figure 8:
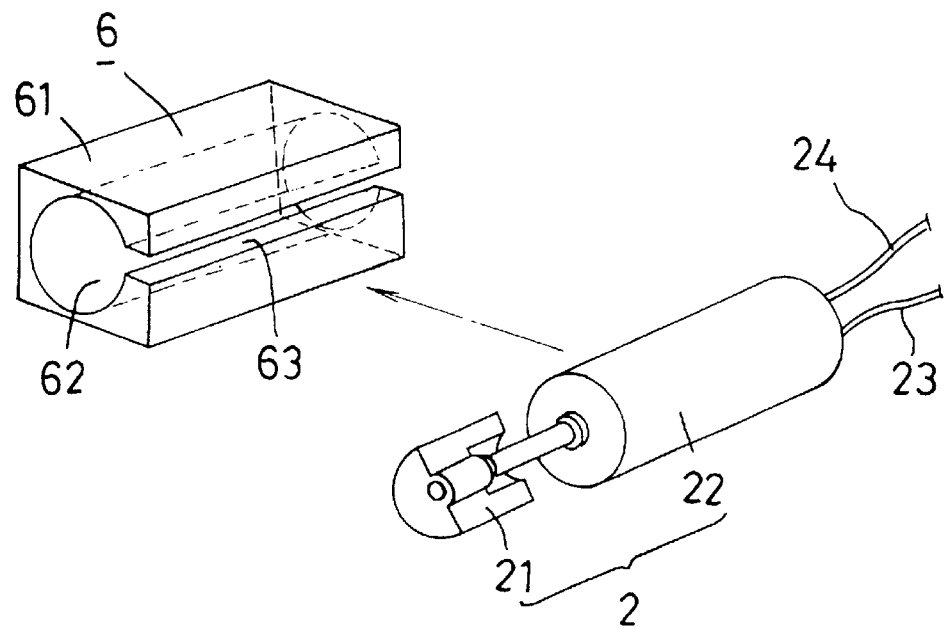
FIG. 8 is a perspective view showing the process for having a vibration generator attached to a conventional bracket.
Figure 9:
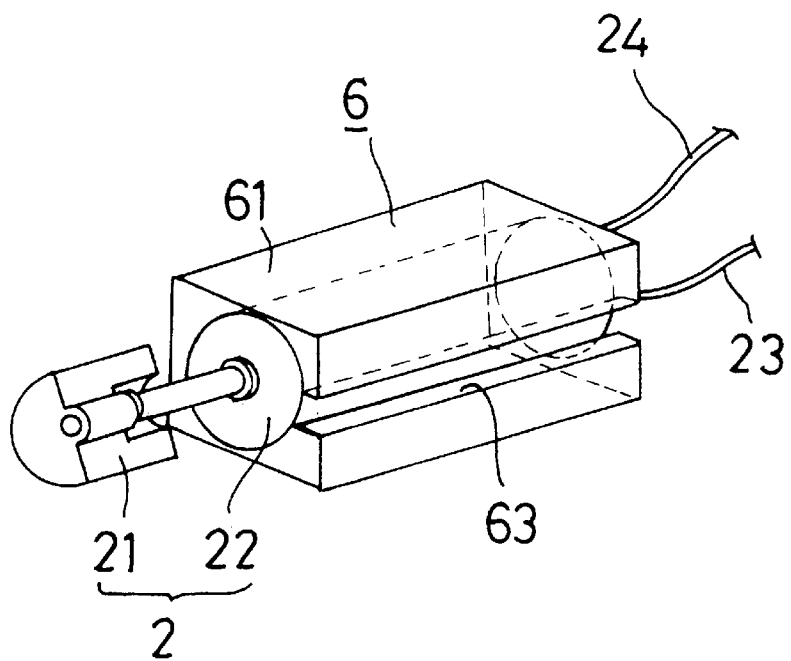
FIG. 9 is a perspective view showing a vibration generator is attached to a conventional bracket.

As a result, the motor 22 of the vibration generator 2 is, shown in FIG. 7, placed into the through hole 42 of the bracket 4. The rear end face of the motor 22 contacts with the projection 44 of the bracket 4, whereby the motor 22 is axially positioned relative to the bracket 4.

As shown in FIG. 7, since the bracket 4 is closed in a region R wherein the slit 43 is not provided, the inner periphery of the bracket 4 comes into tightly pressing contact with the outer periphery of the motor 22 in the region R, to obviate the change of the rotating angle posture of the motor 22.

Figure 3:
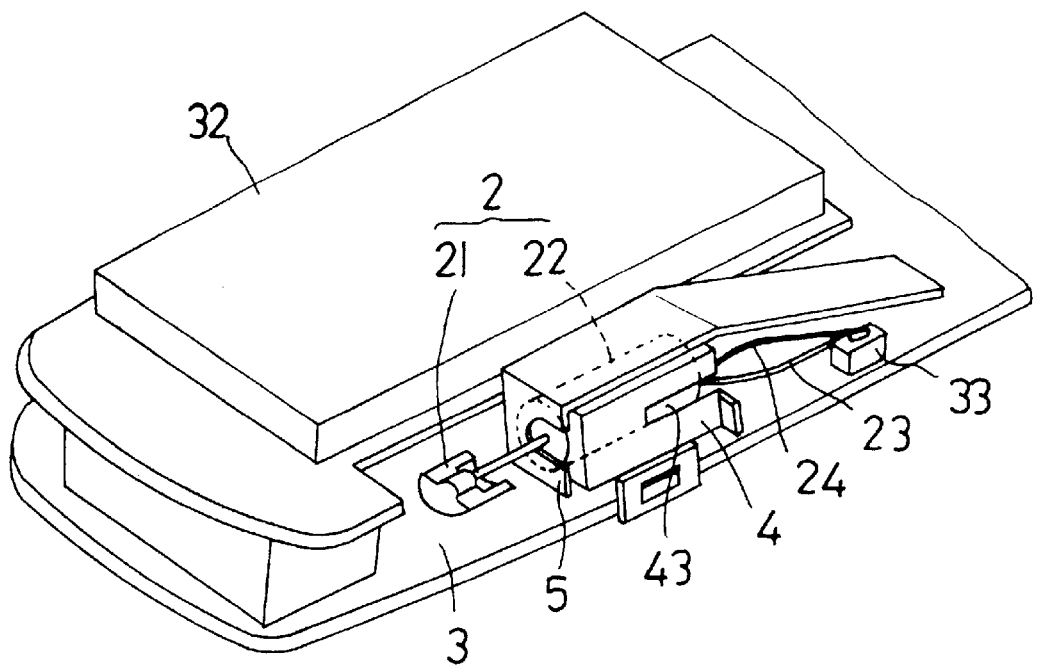
FIG. 3 is a perspective view showing that a vibration generator and a bracket are attached to a holder on a circuit board.

The vibration generator 2 and the bracket 4 thus constructed are inserted into a holder 5, as shown in FIG. 3, mounted on the circuit board 3 by a press fit. The holder 5 comprises, as shown in FIG. 4, a front vertical rib 51, a rear vertical rib 52, a lower horizontal wall 53, a upper horizontal wall 54, and a back vertical wall 55, to provide a bracket chamber S defined by these members.

The bracket 4 is, thus, pushed into the holder 5 to the position wherein the bracket 4 contacts with the back vertical wall 55, having the bracket 4 held between the lower horizontal wall 53 and the upper horizontal wall 54, and having the motor axially positioned by the front vertical rib 51 and the rear vertical rib 52.

As a result, the inner periphery of the bracket 4 comes into pressing contact with the outer periphery of the motor 22 within the region provided with the slit 43, to secure the motor 22 into the bracket 4 stably. Thereafter, the pair of lead wires 23, 24 extending from the motor 22 is inlet at its end into a socket 33 on the circuit board 3, to have the motor 22 electrically connected.

Figure 4:
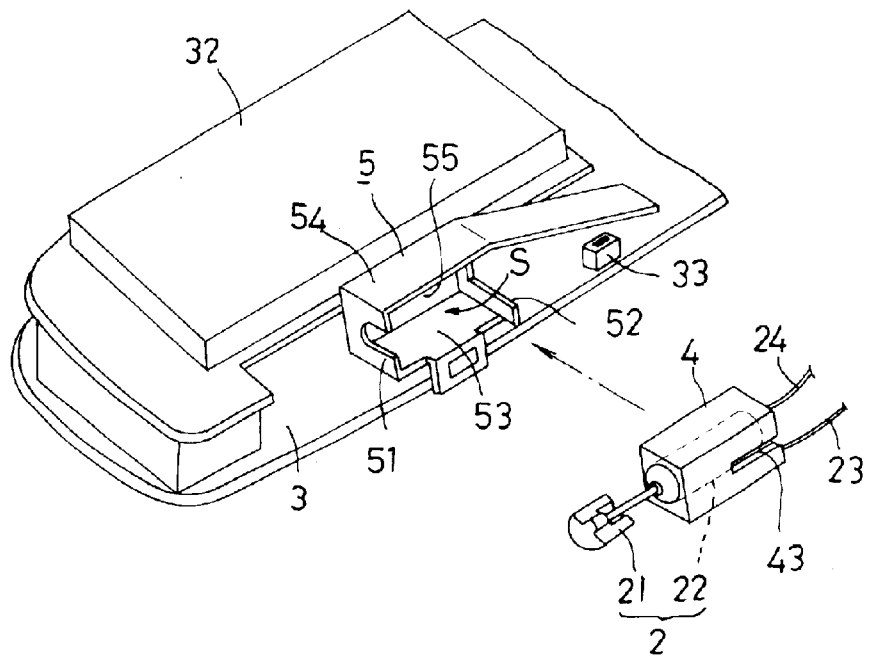
FIG. 4 is a perspective view showing the process for having a bracket inserted into a holder on a circuit board by a press fit.

With the portable telephone described, the motor 22 is accommodated into the bracket 4 as shown in FIG. 7, and the bracket 4 is then inserted into the holder 5 on the circuit board 3 by a press fit as shown in FIG. 4. In this process, the inner periphery of the bracket 4 comes into pressing contact with the outer periphery of the motor 22 within the region R wherein the slit 43 is not provided, to obviate the change of the rotating angle posture of the motor 22, so that when the bracket 4 is inserted into the holder 5 by a press fit, the lead wires 23, 24 of the motor 22 in the bracket 4 are unlikely to be impaired due to the interference with the back vertical rib 52, etc.

The device of the present invention is not limited to the foregoing embodiment in construction but can be modified variously by one skilled in the art without departing from the spirit of the invention as set forth in the appended claims. For example, the present invention can be applied to the supporting construction of the vibration generator provided with pagers and video game players and the like.

What is claimed is:

1. An electronic device comprising:
    a casing,
    a vibration generator having an eccentric weight member attached to the output shaft of a motor, and
    a bracket made from elastic material, having the motor accommodated therein, and held in the casing,
    wherein the bracket comprises a prism-shaped body, a through hole in which the motor is tightly fitted and provided on the central portion of the body, and a slit provided completely through the peripheral wall defining the through hole and cut from one end face of the body and extending to a central portion of the body for a specified distance.

2. An electronic device according to claim 1, wherein a projection to contact with an end face of the motor is provided on one end portion which is included by the bracket and which is formed with the slit.

3. An electronic device according to claim 1, wherein a holder is arranged inside the casing to hold the bracket, the holder comprises a front vertical rib, a rear vertical rib, a lower horizontal wall, a upper horizontal wall, and a back vertical wall, the bracket is held between the lower horizontal wall and the upper horizontal wall, and the front vertical rib and the rear vertical rib have the bracket axially positioned.

* * * * *